July 18, 1933.  J. S. REID  1,919,130
CHANNEL
Filed Sept. 20, 1930
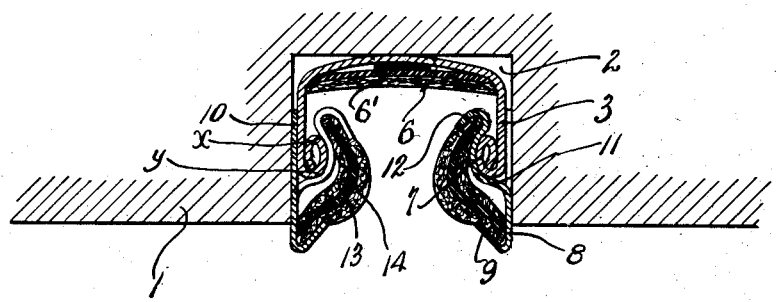
Fig. 1
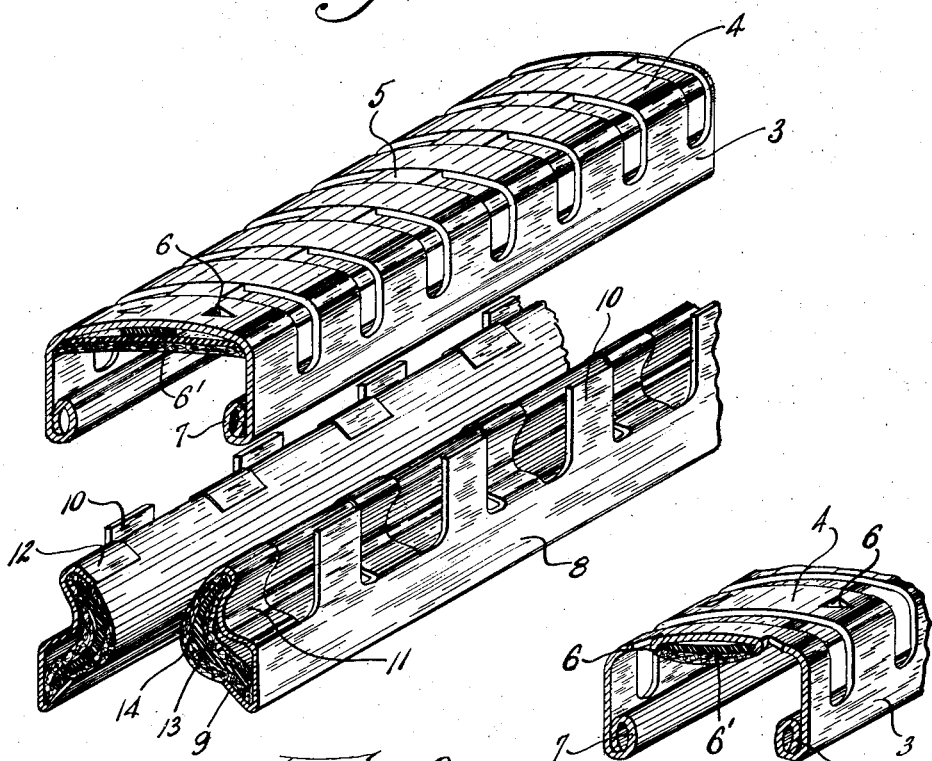
Fig. 2
Fig. 3
INVENTOR
JAMES S. REID
BY
Brockett, Hyde, Higley & Meyer
ATTORNEYS Patented July 18, 1933

1,919,130

UNITED STATES PATENT OFFICE

JAMES S. REID, OF SHAKER HEIGHTS, OHIO, ASSIGNOR TO THE REID PRODUCTS COMPANY, OF CLEVELAND, OHIO, A CORPORATION OF OHIO

CHANNEL

Application filed September 20, 1930. Serial No. 483,221.

The invention disclosed in this application relates to glass run channel used, for example, in the automotive industry.

The object of the present invention is to improve the appearance of the exposed portions of glass run channel used with the panes of glass in motor vehicles, for example. These channels have been made in various ways, but generally speaking, each comprises a U-shaped channel member with its more or less exposed glass engaging lips covered with felt or the like to prevent noise and rattle and to cushion the glass. This felt or other material is more or less unsightly to begin with and in use becomes faded and hence is unattractive and does not harmonize with its surroundings.

More specifically, the invention disclosed in this application relates to glass run channel comprising a U-shaped transversely yielding channel member provided with beads at the outer edges of the side flanges thereof and adapted to receive combined lip pad and finishing strip structures removably secured to said beads.

The invention as above disclosed and additional features thereof will be brought out in the embodiment set forth in the following description, drawing and claims.

Referring to the drawing, Fig. 1 shows a section of a window frame provided with the present improved channel; Fig. 2 taken collectively shows in perspective a portion of the channel with the parts separated; and Fig. 3 is a perspective view of a portion of a slightly modified form of channel member.

In the embodiment shown, 1 represents a window frame provided with the usual window groove 2, said groove being made up in any suitable manner.

The channel of the present application includes a substantially U-shaped channel member having continuous longitudinal side edge portions 3 connected by transverse straps 4, said straps being longitudinally spaced to provide alternate transverse slots extending from within one side wall of the channel member through the bottom thereof into the other side wall of said channel member. Within this channel member and extending longitudinally along the base thereof is a glass-engaging cushioning strip 6' of rubber or the like, said strip being secured in place by prongs 6 struck inwardly from the straps 4. If desired and as shown, said strip may have an outer cover of felt or the like. In the channel member of Figs. 1 and 2, said cushioning strip extends the full width of the base thereof but in the modified form of channel member shown in Fig. 3, the cushioning strip 6' is of less width.

The free or outer edge portion 3 of each channel member side wall is provided with a bead 7 formed by folding or rolling the metal thereof inwardly, and these beads not only give rigidity to said edge portions but serve to hold them in continuous straight form. Said beads also serve as mediums for receiving the combined lip pad and finishing strip units, as will appear.

The lip pad and finishing strip units of the present application each comprises a strip 8 of more or less ornamental material such as aluminum, plated brass, steel, or the like, having bent therefrom in an angular direction a lip pad securing flange 9. The opposite edge of this strip 8 is cut to provide straight tongues 10 lying in the same plane as the strip 8 and alternate lip pad clamping tongues 11, curved away from the plane of the tongues 10 so as to receive one of the channel member beads 7. Each of these curved tongues 11 terminates in or is otherwise suitably provided with a lip pad securing flange 12. Between the securing flanges 9 and 12 of each finishing strip any suitable glass-engaging lip pad may be arranged. In the embodiment shown, each lip pad comprises a stuffing core 13 of fabric or the like and an outer covering 14 of felt or the like, said pad being shaped so as to fit snugly between the flanges 9 and 12 of the finishing strip, with the tongues 11 being so curved as to back up this pad to some extent and also with the tongues 10 furnishing a spring clamp for engagement with one of the channel member beads 7. The straight tongues 10 of each finishing strip extend along the outside of the side walls of the channel member, while the curved tongues 11 engage over the channel member beads on the inside, as shown in Fig. 1, giving points of contact at X and Y, Fig. 1, which allow for a flexing of the curved tongues 11 and hence a yielding of the entire channel.

In use, the lip pad and finishing strip units which may be polished, each desired, are suitably applied to the beads 7 of the channel member as by a longitudinal sliding action or by a transverse snapping of each unit onto a bead, thereafter the channel being placed in a window groove. If desired, the lip pad and finishing strip units may be snapped into place on the beads of the channel member after said member is in place in the window groove. At any time after installation, the lip pad and finishing strip units may be removed for renewal, polishing, or the like, as will be readily understood.

What I claim is:

1. A glass run channel, comprising a generally channel shaped structure having a base and a pair of side walls, and glass-engaging lip pad and finishing strip units removably mounted on the outer edge portions of said side walls, there being one such unit for each of said side walls.

2. A glass run channel as set forth in claim 1, characterized in that the outer edge portion of each of said side walls includes a longitudinally disposed bead and in that said lip pad and finishing strip units are removably associated with said beads.

3. A glass run channel as set forth in claim 1, characterized in that the outer edge portion of each of said side walls includes a longitudinally disposed integral bead and in that said lip pad and finishing strip units are removably associated with said beads.

4. A glass run channel as set forth in claim 1, characterized in that said lip pad and finishing strip units are removably clamped to the outer edge portions of said side walls.

5. A glass run channel as set forth in claim 1, characterized in that said lip pad and finishing strip units are slidably and removably mounted on the outer edge portions of said side walls.

6. A glass run channel as set forth in claim 1, characterized in that the outer edge portion of each of said side walls includes a longitudinally disposed bead and in that said lip pad and finishing strip units are provided with means for removable snap engagement with said beads.

7. A glass run channel as set forth in claim 1, characterized in that the outer edge portion of each of said side walls includes a longitudinally disposed bead and in that said lip pad and finishing strip units are slidably associated with said beads.

8. A glass run channel as set forth in claim 1, characterized in that the outer edge portion of each of said side walls includes a longitudinally disposed bead and in that said lip pad and finishing strip units are removably clamped to said beads.

9. A glass run channel as set forth in claim 1, characterized in that the finishing strip part of each of said units is provided with integral means for securing thereto the glass-engaging lip pad part of said unit.

10. A glass run channel as set forth in claim 1, characterized in that the finishing strip part of each of said units is provided with opposed flanges for securing thereto the glass-engaging lip pad part of said unit.

11. A glass run channel as set forth in claim 1, characterized in that the finishing strip part of each of said units includes a pair of flanges adapted to engage opposite sides of an outer edge portion of a side wall of said channel shaped member, one of said flanges having the lip pad part of said unit secured thereto.

12. A glass run channel as set forth in claim 1, characterized in that the outer edge portion of each of said side walls includes a longitudinally disposed bead and in that the finishing strip part of each of said units includes a pair of flanges adapted to engage opposite sides of one of said beads.

13. A glass run channel as set forth in claim 1, characterized in that the outer edge portion of each of said side walls includes a longitudinally disposed bead and in that the finishing strip part of each of said units includes a pair of flanges adapted to engage opposite sides of one of said beads, one of said flanges being curved to conform to the shape of said bead.

14. A glass run channel, comprising a generally channel shaped structure having a base and a pair of side walls, and metallic finishing strips for the outer longitudinal edge portions of said side walls, said strips being slidably mounted on said side wall edge portions.

15. A glass run channel, comprising a generally channel shaped structure having a base and a pair of side walls, said side walls being provided at their outer longitudinal edge portions with laterally extending projections, and metallic finishing strips for the outer longitudinal edge portions of said side walls, said strips being slidably mounted on said side walls and being associated with said projections.

16. A glass run channel, comprising a generally channel shaped structure having a base and a pair of side walls, said side walls being provided at their outer longitudinal edge portions with laterally extending projections, and metallic finishing strips for the outer longitudinal edge portions of said side walls, said strips being slidably mounted on said side walls and enclosing the projections thereof.

17. A glass run channel, comprising a generally channel shaped member having a base and a pair of side walls, said side walls being provided throughout substantially their entire length with transversely disposed slots, and metallic finishing strips for the outer longitudinal edge portions of said side walls, said strips being slidably mounted on said side wall edge portions.

18. A glass run channel, comprising a generally channel shaped member having a base and a pair of side walls, said base and said side walls being provided throughout substantially their entire length with transversely disposed slots, and metallic finishing strips for the outer longitudinal edge portions of said side walls, said strips being slidably mounted on said side wall edge portions.

19. A glass run channel, comprising a generally channel shaped member having a base and a pair of side walls, said side walls being provided throughout substantially their entire length with transversely disposed slots and being provided at their outer longitudinal edges with laterally extending projections, and metallic finishing strips for the outer longitudinal edge portions of said side walls, said strips being slidably mounted on said side walls by the projections thereof, said projections being enclosed by said strips.

JAMES S. REID.